United States Patent
Sidor et al.

[11] 3,917,970
[45] Nov. 4, 1975

[54] TEMPERATURE SENSOR WITH HYSTERESIS PROVIDING CIRCUITS

[75] Inventors: Edward F. Sidor, Lombard; Rand J. Eikelberger, Glenview, both of Ill.

[73] Assignee: Illinois Tool Works Inc., Chicago, Ill.

[22] Filed: Dec. 23, 1974

[21] Appl. No.: 535,475

[52] U.S. Cl. ............ 307/117; 73/362 CP; 317/133
[51] Int. Cl.² .................... H01L 37/04; G01K 7/38
[58] Field of Search .................. 73/362 R, 362 CP; 324/34 TE; 317/133; 307/117; 323/70, 89 T

[56] References Cited
UNITED STATES PATENTS

| | | | |
|---|---|---|---|
| 2,350,329 | 6/1944 | Hornfeck | 73/362 CP |
| 2,756,595 | 7/1956 | Rathenau et al. | 73/362 R X |
| 3,413,540 | 11/1968 | Van Sant | 73/362 CP X |
| 3,756,081 | 9/1973 | Young | 73/362 R X |
| 3,869,619 | 3/1975 | Camillo | 307/117 |

Primary Examiner—Richard C. Queisser
Assistant Examiner—Frederick Shoon
Attorney, Agent, or Firm—Robert W. Beart; Glenn W. Bowen

[57] ABSTRACT

A temperature sensor is disclosed which produces an electrical output signal when a predetermined high temperature is reached and which maintains that signal until the temperature has fallen to a predetermined low temperature so as to achieve temperature hysteresis. The sensor includes two magnetic cores which are wound with wires to form inductances. The cores are constructed of different material so that their transition points occur at different temperatures. Sensors are disclosed which include circuitry that sense the change of state of the high temperature core at its transition temperature when the temperature is increased to the high predetermined temperature, and the change of state of the low temperature coil at its transition temperature when the temperature is decreased to the low predetermined temperature.

6 Claims, 6 Drawing Figures

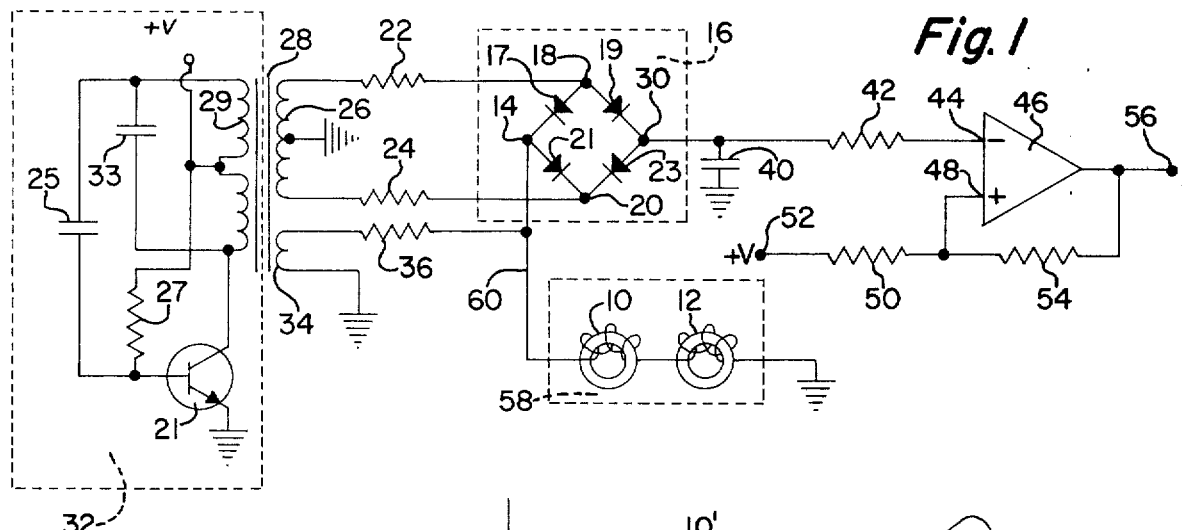
Fig. 1
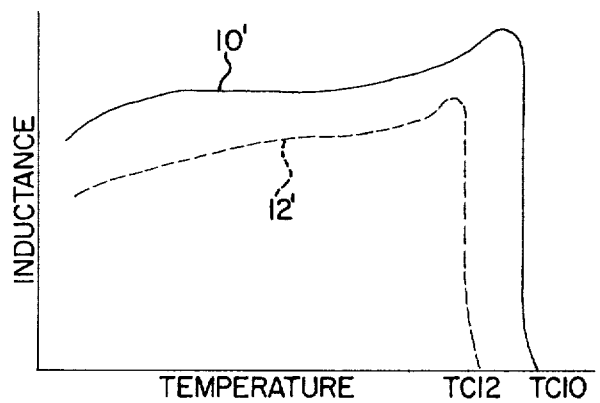
Fig. 2
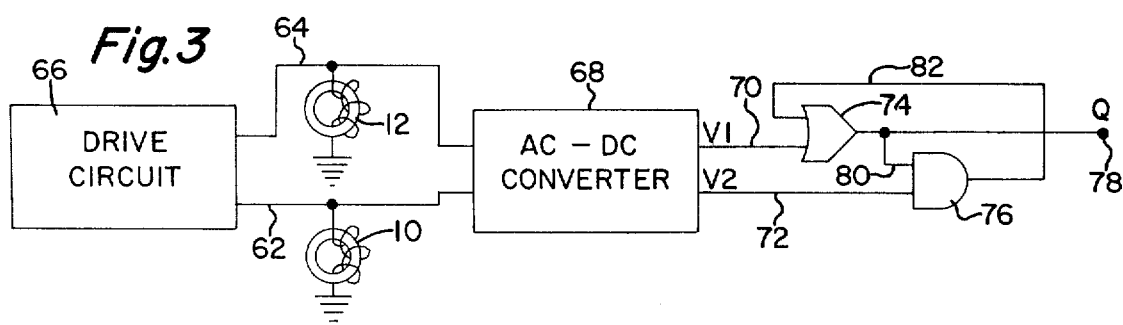
Fig. 3
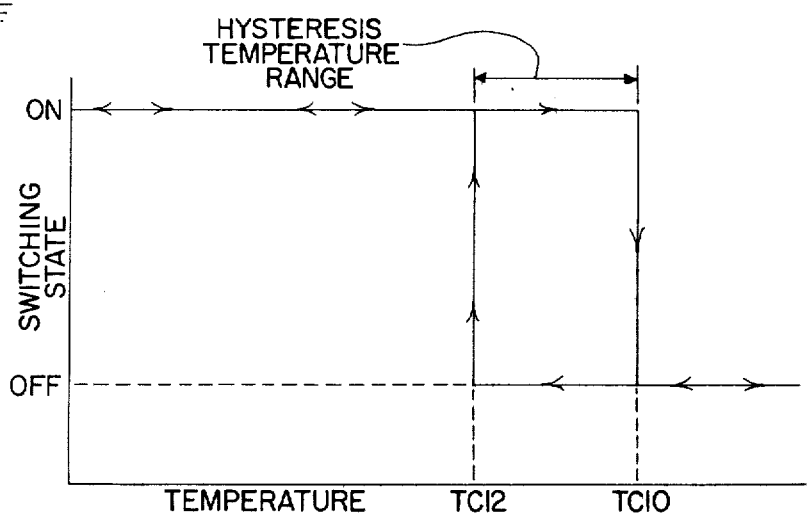
Fig. 4
Fig. 5

TEMPERATURE SENSOR WITH HYSTERESIS PROVIDING CIRCUITS

BACKGROUND OF THE INVENTION

Temperature sensors which employ magnet core inductance elements that rely on the transition of the core from a substantial inductance, when the temperature affecting the core is below its Curie point, to a substantially zero inductance after the temperature has increased beyond the Curie point of the core are known. The use of a single magnetic core for sensing the increase of temperature beyond the Curie temperature of the core provides an effective temperature sensor. However, the change of inductance of such a core from a relatively high value to a substantially zero value occurs very rapidly at the Curie temperature. There are many temperature control applications for which this type of sensor is inadequate since the temperature may continually increase and decrease slightly around the Curie temperature so as to cause rapid oscillation of the inductance of the core from its high value to its low value, resulting in instability in the control system.

In order to overcome this problem, the present invention provides for temperature hysteresis which is achieved by two inductively wound cores, one of which has a high Curie temperature and the other of which has a lower Curie temperature. The two cores are connected into sensing circuits, either in parallel or in series in accordance with the design of the circuit, so that the control signal will be switched from one state when the Curie temperature of the highest Curie temperature core is reached and will remain in this state until the temperature decreases to the Curie temperature of the lowest Curie temperature core. In this manner, oscillation of the output control signal about the sensed temperature will be prevented.

DESCRIPTION OF THE DRAWINGS

The present invention is illustrated by reference to the drawings in which:

FIG. 1 is a schematic diagram of an embodiment of the present invention in which the two magnetic core inductances are connected in series to a terminal of a synchronous detector;

FIG. 2 is a graph illustrating the variation of inductance of the two sensing cores of the present invention vs. temperature;

FIG. 3 is a schematic diagram of a second embodiment of the present invention in which two magnetic cores are independently driven and the hysteresis effect is obtained by means of a digital logic circuitry;

FIG. 4 is a truth table that illustrates the logic states of the circuit of FIG. 3;

FIG. 5 is a graph which illustrates the switching states of the illustrated embodiments of the present invention.

TECHNICAL DESCRIPTION OF THE INVENTION

Figure 6:
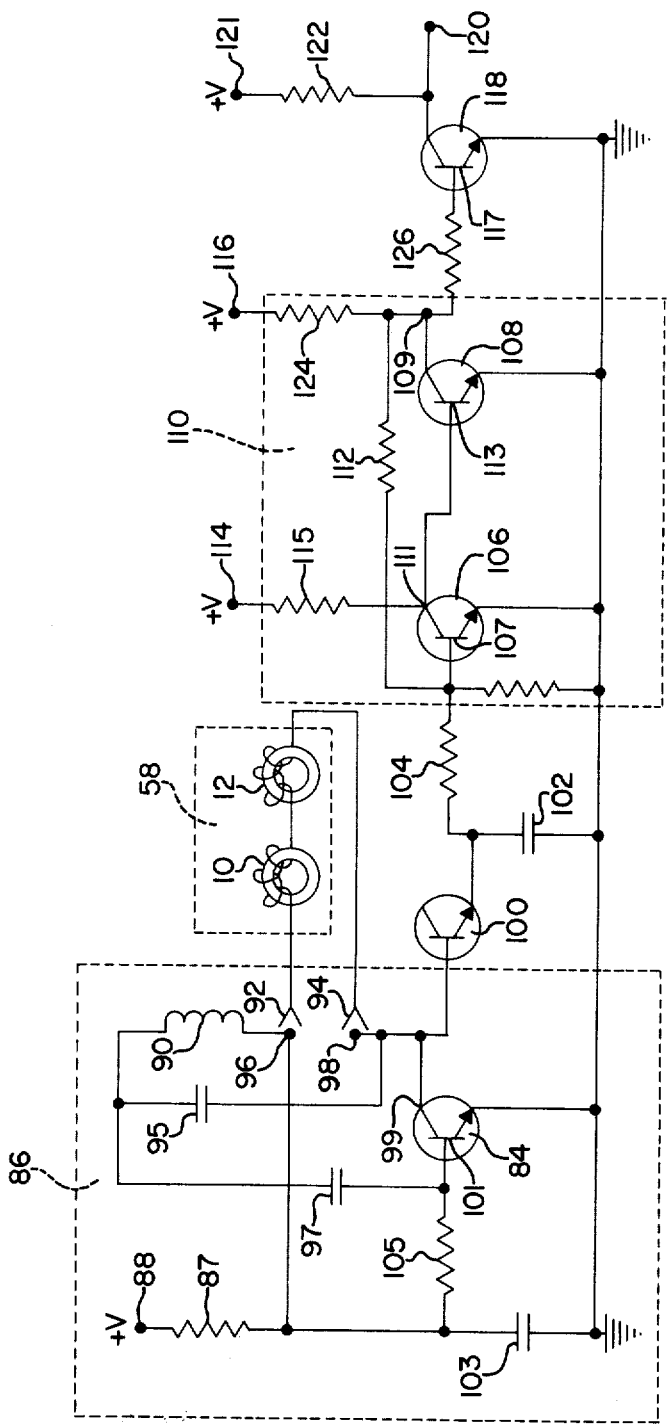
FIG. 6 is a schematic illustration of the presently preferred embodiment of the present invention which utilizes two magnetic cores in series as a part of the frequency determining inductive element of the oscillating circuit.

The present invention relies on the use of two magnetically saturable cores 10,12 which are wound with wires to form inductive elements. The cores 10,12, which are labelled with the same number in all of the schematics of the figures, are constructed of different magnetic materials so that they respond at different temperatures with a rapid transition of state from a high inductance element to a low inductance element. The core 10 has a higher temperature transition point than does the core 12. These cores are preferably toroidal shaped cores and are connected to a sensing circuit which provides an output signal indication of the change of inductance of the cores 10,12 as the temperature changes. The transition point of these cores preferably occurs at their Curie temperature.

As the temperature to be sensed increases past the Curie temperature of the low Curie temperature core 12, the inductance of the core 12 will drop substantially to zero. The sensing circuit is designed so that this change of inductance does not provide a change in the output signal. As the temperature increases still further, however, the Curie temperature of the higher Curie temperature of the core 10 is reached; and at this time, the inductance of the core 10 will drop to zero and the output control signal will change states. As the temperature decreases past the Curie temperature of the core 10, the control signal remains in its switched state until the temperature reaches the Curie point temperature of the lower temperature core 12, at which time the inductances of both the cores 10, 12 will be returned to high values, and the output signal will revert to its initial state.

One circuit embodiment for obtaining the desired result is shown in FIG. 1 in which the cores 10, 12 are connected in series to a junction point 14 of a synchronous detector 16 made of four diodes 17, 19, 21 and 23 which are connected in the form of a full-wave bridge rectifier. The source to the synchronous detector 16 is supplied across the terminals 18, 20 through the resistors 22, 24 from the secondary winding 26 of the transformer 28. The primary winding 29 of the transformer 28 forms part of the frequency determining elements of a Harley oscillator 32. Other types of oscillators or signal generators might be employed, if desired.

The transformer 28 has a second output winding 34 which supplies a signal through the resistor 36 to the series coupled cores 10, 12. The output of the synchronous detector is taken at the terminal 30 which is coupled to a smoothing capacitor 40 which tends to provide a more constant DC level.

The input resistor 42 is coupled between the capacitor 40 and an inverting input terminal 44 of an operational amplifier 46. The operational amplifier 46 has its noninverting input terminal 48 connected to the resistor 50, and the other end of the resistor 50 is connected to a source of positive voltage at the terminal 52. A feedback resistor 54 is connected between the output terminal 56 of the amplifier 46 and the noninverting input terminal 48 in order to provide positive feedback to the amplifier 46. The use of a positive feedback in an amplifier is a generally known expedient for providing an output signal which exhibits hysteresis for output stability.

The operational amplifier 46 is of the type that is a current-differencing amplifier capable of providing a positive saturation signal or a negative saturation signal. If the current to the inverting input terminal 44 of the amplifier is greater than the current contributed through resistor 54 plus the current through resistor 50, the output of the amplifier will be in its negative saturation state. In this state, the cores 10, 12 both have a relatively high inductance since the temperature of the cores will be below the Curie temperature TC12 of the core 12. As the temperature increases past the Curie temperature TC12 of the core 12, the inductance of the core 12 will drop rapidly to substantially a zero value causing a reduction in the output voltage on the terminal 30 of the synchronous detector, shown in FIG. 2 where the curves 10',12' correspond to the cores 10, 12 respectively. However, since the circuit values are such that the current into terminal 44 will still exceed the current through resistor 54, plus the current through the resistor 50, the output signal from the amplifier 46 will remain in its negative saturation state. The calculation of circuit values to achieve this result may be accomplished by conventional calculations well known to those skilled in the art. Thus, the output signal on the output terminal 56 of the amplifier 46 will not change its state as the temperature increases to the temperature TC12 and it will remain at a negative saturation level.

As the temperature increases still further, however, the inductance of the core 10 will drop rapidly to substantially a zero value when its Curie point temperature TC10 is reached. This will cause the output of the terminal 30 to drop substantially, thereby substantially lowering the current to the terminal 44. When the input current at the terminal 44 becomes less than the reference current minus the current which now occurs across the feedback resistor 54, the output of the amplifier 46 will go to a positive saturation level. The output signal of the amplifier 46 will then indicate that the temperature being sensed is equal to or greater than the Curie temperature TC10 of the core 10.

If the temperature now decreases so that it drops below the Curie temperature TC10 of the core 10, the output of the amplifier 46 will remain in a positive saturation state, because of its hysteresis characteristics of the circuit, until the temperature falls below the Curie temperature TC12 of the core 12. At this point, the inductance of both cores 10, 12 will revert to substantially their initial high inductance values; and the current at the inverting input terminal 44 will again be at a point where it exceeds the current through resistor 50 plus the current increase through the resistor 54, thereby allowing the output amplifier 46 to switch back to its negative saturation state.

The described circuit of FIG. 1, therefore, provides a hysteresis temperature control circuit in which the output signal is switched to one state at a predetermined high temperature and remains in that state until a lower predetermined temperature is reached so that oscillation of the output signal from the circuit is prevented as the temperature cycles around the higher predetermined temperature. This operation of this circuit, and of the circuit of this document, is illustrated graphically in FIG. 5, which represents the switching state of the circuit vs. the sensed temperature.

The circuit of FIG. 1 is especially useful for applications in which the cores 10, 12 may be connected to a separate unit 58 at a remote location through a lead 60. In this manner, the sensing cores may be removed from the remaining portion of the circuitry of FIG. 1 by a large distance and still remain effective in providing the desired temperature sensing. The Hartley oscillator circuit of FIG. 1, in addition to the primary winding 30, includes the transistor 21, the tank capacitor 33, the feedback capacitor 25 and the base resistor 27 from the oscillator circuit.

FIG. 3 shows another circuit in which the cores 10, 12 may be positioned at a location removed from the remainder of the circuit so as to provide a remote temperature indicator. In the circuit of FIG. 3, the cores 10, 12 are connected to the output lines 62, 64, respectively, of the drive circuit 66, which may be an AC oscillator circuit. The outputs of the cores 10, 12 are connected to the inputs of the conventional AC/DC converter 68. The output of the converter 68 is provided on the output lines 70, 72 as the voltage signal V1 and V2, respectively. The DC output voltages V1 and $V_2$ are connected to a latching circuit consisting of the OR gate 74 and the AND gate 76 to supply an output signal, Q, on the terminal 78.

The truth table of FIG. 4 shows the relationship between the Q output signal and the voltages $V_1$ and $V_2$. In the truth table of FIG. 4, the designation Qn indicates the previous state of the output signal 78; while the signal Qn+1 indicates the current state of the output signal 78. A logic level "1" signal for the voltages $V_1$ and $V_2$ indicates that the cores have a substantial inductance and have not yet reached their Curie temperature. The "x" in the Qn column indicates that the state of the output signal for the previous state is immaterial for determining Qn+1.

It is seen from the table that both of the cores 10, 12 will have a substantially high inductance when the temperature is initially below the Curie point temperature TC12, and both of the output signals $V_1$ and $V_2$ will be at a logic level 1 regardless of the previous state of the output signals Qn. The output signal will unconditionally go to a logic level 1 in this instance. This occurs because the logic level 1 signal applied on the line 70 to the input of the OR gate 74 will produce a logic level 1 output signal on the terminal 78. This logic level 1 signal is applied to one input of the AND gate 76 on the line 80, while the other input to the AND gate 76 will be a logic level 1 signal on the line 72. The output of the AND gate 76 is supplied on the feedback line 82 to the other input of the OR gate 74; and thus, the output signal on the terminal 78 will be an unconditional 1 if the temperature has not initially risen to the Curie temperature TC12.

As the temperature increases and the Curie temperature TC12 is reached, the inductance of the core 12 will drop to substantially a zero value and the $V_1$ output signal on the line 70 will correspondingly drop to a logic level 0. At this time the $V_2$ output on the line 72 will remain at a logic level 1 because the ambient temperature of the medium surrounding the cores 10, 12 is between TC12 and TC10. The AND gate 76 will continue to be provided with logic level 1 signals on the lines 80 and 72, thereby allowing it to provide a logic level 1 output signal on the feedback line 82 to the OR gate 74. This retains the logic level 1 output signal at the output terminal 78.

If the temperature continues to rise so that the Curie temperature TC10 of the core 10 is next reached, the $V_2$ output signal on the line 72 will also drop to a logic level 0. When this occurs, the AND gate 76 will no longer be able to supply a logic level 1 output to the OR gate 74; but, instead, it will supply a logic level 0 to the gate 74. Since the $V_1$ input on the line 70 will also be at a logic level 0 at this time, the OR gate 74 will provide a logic level 0 output signal at the terminal 78, thereby indicating that the Curie temperature TC10 of the core 10 has been reached.

If the temperature is now allowed to decrease to the point where it is between the Curie temperature TC10 of the core 10 and the Curie temperature TC12 of the core 12, the $V_2$ output signal on the line 72 will go to a logic level 1 as the inductance of the core 10 increases substantially. However, since the output signal on the line 78 was at a logic level 0 at the last cycle, the AND gate 76 will still provide a logic level 0 signal on the line 82 and the $V_1$ signal on the line 70 will also still be at a logic level 0. Therefore, the output signal on the line 78 will remain at a logic level 0 state. As the temperature decreases still further below the Curie point temperature TC12, the inductance of the core 12 will also increase substantially. Both the output signals $V_1$ and $V_2$ on the line 70, 72 will then be logic level 1 output signals, and this will cause the AND gate 76 to provide a logic level 1 output signal on the line 82 to the OR gate 74. The OR gate 74 will then again provide a logic level 1 output signal at the terminal 78, and the desired hysteresis characteristic is thereby provided in the manner described above.

The circuit shown in FIG. 6 may be constructed by connecting a unit 58 containing the cores 10, 12 to a hybrid circuit which contains the remaining circuitry of the schematic of FIG. 6. The transistors of FIG. 6, are presently available on one integrated circuit chip. The transistor 84 is in a Hartley oscillator circuit 86 which is supplied power through the terminal 88 that is connected to a power supply (not shown). The inductance elements of the oscillator circuit 86 consist of the fixed core 90 and the core unit 58 which has the terminals 92, 94 that may be connected to the terminals 96, 98 of the oscillator circuit. The base-emitter junction of the transistor 100 is employed as diode to supply energy to charge up the capacitor 102 which serves as a peak detector. The capacitor 102 supplies a DC voltage level through the resistor 104 to the base 107 of the transistor 106. The transistor 108, along with the transistor 106, is employed as an operational amplifier 110. A positive feedback path is supplied in the amplifier 110 by the resistor 112 connected between the collector 109 of the transistor 108 and the base 107 of the transistor 106. The power supply voltage is supplied to the amplifier 110 through the terminals 114 and 116. The output of the amplifier 110 is supplied to the output transistor 118 which is coupled to the power supply at the terminal 121 through the load resistor 122. The state of the transistor 118 determines the output voltage on the output terminal 120.

As the temperature initially increases past the Curie temperature TC12 of the core 12, the voltage across the capacitor 102 will decrease; but the transistor 106 will remain in a saturated condition. The transistor 106 will be saturated due to the positive feedback current that is supplied through the feedback resistor 112. The transistor 108 will be turned off at this time, since the collector 111 of the transistor 106, which is connected to the base 113 of the transistor 108, will be at a very low voltage. This condition will be maintained as long as the temperature remains greater than TC12 but less than TC10.

The Hartley oscillator circuit of FIG. 6, in addition to the fixed inductance 90 and the cores 10, 12, includes the tank capacitor 95 coupled to the collector 99 of the transistor 84, the feedback capacitor 97 coupled to the base 101 of the transistor 84, the by-pass capacitor 103 coupled to ground, the base resistor 105 and the supply resistor 87 coupled to the power supply terminal 88 in order to form the oscillator circuit.

When the ambient temperature around the unit 58 increases beyond the Curie temperature TC10 of the core 10, both of the cores 10, 12 will go to their low inductance values. The voltage across the capacitor 102 will then be at its minimum value and the voltage at the base 107 of the transistor 106 will correspondingly be at a low level. The transistor 106, which was previously driven to saturation by the high voltage at the base 107 when the inductance of cores 10, 12 were at high levels, now receives less base drive current; and the transistor 106 will be turned off since the feedback resistor 112 can no longer maintain the necessary base current. This in turn will cause the transistor 108 to saturate due to the base current supplied through the resistor 115. The current supplied through the load resistor 124 for the transistor 108 and the base resistor 126 coupled to the base 117 of the transistor 118 will then decrease to the point where the transistor 118 will be turned off, thereby causing the output voltage on the terminal 120 to rise substantially to voltage applied to the terminal 121.

The circuit will remain in this state if the temperature is decreased to a value between the Curie temperature TC10 and the temperature TC12, since with the transistor 108 turned on, there will be no substantial feedback of current through the resistor 112 to the base 107 of the transistor 106. The circuit values are such that the increase of inductance that occurs for the core 10 below the temperature TC10 cannot supply sufficient base current to turn the transistor 106 on; but when the inductance of the core 12 is also substantially increased due to the temperature falling below the Curie point temperature TC12, the base of the transistor 106 will receive sufficient drive current to be driven to saturation. Calculation of circuit values to achieve the desired switching action can again be achieved by conventional calculations in the manner well known to those skilled in the art. When the transistor 106 is saturated, the transistor 108 is again turned off and feedback is again supplied through the resistor 112 to help maintain the transistor 106 in its on state. With the transistor 108 turned off, there is an increase in drive current through the resistor 124 and the resistor 126 to the base of the transistor 118 which results in the transistor 118 going into saturation, causing the output voltage on the terminal 120 to drop to a low level. The circuit of FIG. 6, therefore, provides the desired hysteresis by utilization of an amplifier having positive feedback which has an output signal that varies between a fixed supply voltage level and a saturation level.

The invention is claimed as follows:

1. A temperature sensor comprising a first inductively wound magnetic core having a first Curie temperature, a second inductively wound magnetic core having a second Curie temperature which is greater than said first Curie temperature, and electrical circuit means coupled to said first and second inductively wound cores which provides an output signal that changes from a first state to a second state at the time the ambient temperature affecting said cores increases to said second Curie temperature and which maintains said second state signal until said ambient temperature decreases to said first Curie temperature, at which time said circuit means provides an output signal which reverts to said first state.

2. A temperature sensor as claimed in claim 1, wherein said first and second inductively wound cores are connected in series and said circuit means comprises a synchronous detector having first, second, third and fourth terminals, said first terminal being connected to said first and second inductively wound cores in series, input signal means coupled to supply an input signal across said second and third terminals, and an excitation signal to said first and second inductively wound cores, and an operational amplifier comprising an inverting input terminal coupled to said fourth terminal, a non-inverting input terminal, an output terminal and a feedback resistor coupled between said output terminal and said non-inverting input terminal.

3. A temperature sensor as claimed in claim 1, wherein said circuit means comprises a three-state means which is coupled to said first and second inductively wound cores and which is constructed to be affected by the inductance changes of said first and second inductively wound cores so as to change from a first state to a second state at the time said ambient temperature increases to said first Curie temperature, so as to change from a second state to a third state at the time said ambient temperature increases to said second Curie temperature, so as to revert to said second state from said third state at the time said ambient temperature decreases to said second Curie temperature and so as to revert to said first state from said second state at the time said ambient temperature decreases to said first Curie temperature and output means coupled to said three-state means constructed to provide an output signal that changes from a first state to a second state when said three-state means changes from its second to its third state, said output means being constructed to maintain said output signal at said second state until said three-state means changes from its second state to its first state at which time said output signal from said output means will revert to its first state from its second state.

4. A temperature sensor as claimed in claim 1, wherein said circuit means comprises alternating current drive circuit means having a first output coupled to said first inductively wound core and a second output coupled to said second inductively wound core, an alternating current to direct current convertor having a first input coupled to said first inductively wound core, a second input coupled to said second inductively wound core, a first output associated with said first inductively wound core and a second output associated with said second inductively wound core, a two input AND gate having one input coupled to said second output, a two input OR gate having its output coupled to the other input of said AND gate, said first output of said converter being coupled to one input of said OR gate and the output of said AND gate being coupled to the other input of said OR gate with said output of said OR gate serving as the output signal from said circuit means.

5. A temperature sensor as claimed in claim 1, wherein said circuit means comprises an oscillator means coupled to said first and second inductively wound cores in a manner such that said first and second inductively wound cores form part of the frequency determining network of said oscillator and output means comprising an amplifier with positive feedback having its input coupled to the output of said oscillator.

6. A temperature sensor comprising a first inductively wound magnetic core having a first transition temperature, a second inductively wound magnetic core having a second transition temperature which is greater than said first transition temperature, and electrical circuit means coupled to said first and second inductively wound cores which provides an output signal that changes from a first state to a second state at the time the ambient temperature affecting said cores increases to said second transition temperature and which maintains said second state signal until said ambient temperature decreases to said first transition temperature, at which time said circuit means provides an output signal which reverts to said first state.

* * * * *